Patented Dec. 29, 1953

2,664,441

UNITED STATES PATENT OFFICE 2,664,441

SEPARATION OF ORGANIC ACIDS

Harry S. Owens, John B. Stark, and Alan E. Goodban, Berkeley, Calif., assignors to the United States of America as represented by the Secretary of Agriculture No Drawing. Application July 19, 1951, Serial No. 237,656

6 Claims. (Cl. 260—527)

(Granted under Title 35, U. S. Code (1952), sec. 266)

The invention herein described may be manufactured and used by or for the Government of the United States of America for govermental purposes throughout the world without the payment to us of any royalty thereon.

This invention relates to the separation of organic acids from mixtures thereof. A particular aspect of the invention concerns the separation of lactic acid from liquids containing this acid and other ingredients, e. g., sugar beet liquors or culture media resulting from the biosynthesis of lactic acid from lactose. Other aspects of the invention relate to the separation of glycolic, succinic, pyrrolidine carboxylic, malic, citric, oxalic, and other acids from sugar beet liquors. These and other useful results are accomplished by the use of conditioned anion exchangers as hereinafter described. Further objects and advantages of this invention will be obvious from the description herein.

It is well known in the art that anion exchangers may be used in separating organic acids. For example, a solution of two similar organic acids may be contacted with an anion exchanger in the base form to adsorb both acids. By eluting the exchanger bed with an aqueous solution of a strong mineral acid it is possible to elute fractions relatively pure with regard to each of the acids. However, such techniques do not give clear-cut separation and it will be found that a substantial proportion of the eluate contains a mixture of both acids. As an example, acids A and B are adsorbed on the anion exchanger bed in the base form, the bed is then eluted with a solution of a strong acid and the eluate is collected in separate portions. Disregarding the forerunnings, portions of eluate containing only acid A will first be received. As the process continues the proportion of acid A in each portion of eluate will decease while at the same time the proportion of acid B therein will increase until finally portions of eluate are obtained in which only acid B is present. Thus the total result will be portions of eluate containing only acid A, portions of eluate containing only acid B, and the intermediate portions of eluate containing both A and B. In using exchange columns and flow rates of practical and reasonable limits, it will be found that not more than 50% of the total amount of each acid will be recovered in the pure form. In most cases much more than half of each acid will be present in the eluate fractions containing the mixtures. It is evident from the above that complete recovery of each acid will require several passages through the column or the use of unreasonably long columns and slow elution rates.

It has now been found that a sharp separation can be achieved by initially conditioning the anion exchange bed. This conditioning involves contacting the exchanger while in its base form with an aqueous solution of an acid in such amount as to adjust the pH of the exchanger to a pre-determined level. In performing the conditioning two factors are foremost to be considered. One is the acid to be used; the second is the pH to be applied. With regard to the first factor, the conditioning acid should have an acid strength, that is, dissociation constant at least as high and preferably higher than that of the acids to be separated. Further, in many cases a volatile acid is preferred as it can then be removed from the eluates by evaporation. Accordingly, formic acid which is easily volatile is one of our preferred conditioning acids. Further formic acid has a pK of 3.75 and is thus suited for the separation of many acids such as lactic (pK 3.86), glycolic (pK 3.82), succinic (pK 4.19), acetic (pK 4.76), and so forth. For the separation of stronger organic acids, hydrochloric acid may be used as the conditioner and is thus useful with regard to oxalic (pK 1.19), pyrrolidone carboxylic (pK 3.32), malic (pK 3.4), citric (pK 3.06), and so forth. It is evident from the above that the choice of conditioner depends on the acids to be separated and using the principles above stated one can use any acid as the conditioner which possesses the proper acid strength with regard to the acids to be separated.

With regard to the pH of the conditioning treatment, this is an important factor. For maximum efficiency it has been found that the exchanger should be adjusted to a pH which is about 1 to 1.5 pH units below the pK of the weakest acid to be separated. For example, lactic acid has a pK of 3.86 whereas glycolic acid has a pK of 3.82. In separating these acids, the proper pH to employ is about 2.4 to 2.9. In conducting the conditioning the exchanger in the base form is placed in a vessel and stirred with an aqueous solution of the conditioner, the amount of conditioner being adjusted so that after thorough stirring the liquid above the exchanger exhibits the pH desired. The exchanger is then ready for placement in the column. Alternatively, the anion exchanger can be washed in the column with the appropriate acid until the selected pH is reached.

In some cases it is necessary to use a poly-zonal exchange bed, that is, a bed made up of two or more zones, the conditioning agent and/or the pH in each zone being different. Beds of this type are indicated where the mixture to be resolved contains acids of widely differing acid strength. For example a mixture containing lactic, succinic, and glycolic acids which have relatively close pK values can be efficiently resolved with a single bed adjusted with formic acid to about pH 2.6 to 3.0. However, if this mixture also contains the much stronger acids, malic and citric, then the single bed will not give efficient separation of these latter acids although it will give a sharp separation of the three weak acids with respect to both the stronger. That is, the three weaker acids will be obtained in the pure state but the later effluents containing the stronger acids will contain fractions containing both of the stronger acids. To correct this situation, a poly-zonal bed is made up. This column if containing say two zones will have at its top a zone adapted to separate the weaker acids whereas the lower zone will be conditioned with a suitable agent and at a suitable pH to separate the stronger acids. Thus in the above situation, the top zone would be conditioned to a pH of about 2.6 to 3.0 to effect separation of lactic, succinic, and glycolic acids whereas the lower zone would be conditioned to a pH about 1.9 to 2.4 to effect separation of malic and citric acids. The idea of poly-zonal beds can of course be extended to consist of as many zones as is required by the materials present in the mixture to be resolved. Instead of using a poly-zonal bed in a single column, several exchange columns each containing a different conditioning agent and/or pH may be connected by suitable conduits in series so that the initial liquid sample and the eluting liquid will be passed successively through each exchange column. These multiple columns may be placed side by side in which case suitable pumps may be used to introduce the effluent from the bottom of one column into the top of the next succeeding column.

The advantages of our process is that sharp separation of acids is obtained. The conditioning treatment alters the attractive forces between the exchange material and the acids so that the individual acids are widely separated in the column during loading and elution. Thereby the elute fractions obtained contain the pure acids and very little if any effluent is obtained containing mixtures of the acids. Thus by applying our process one can obtain sharp and complete separations using reasonable and practical lengths of columns and rates of elution. Our process has the further advantage that it can separate, sharply and efficiently, individual acids of close ionization constants which could be only very poorly separated by conventional techniques with ion exchangers.

The elution of the conditioned exchange bed containing the adsorbed acids is conducted in the customary manner with an aqueous solution of an acid which is at least as strong as the acid used for conditioning and stronger than the acids to be separated. Usually a strong mineral acid, such as hydrochloric or sulphuric, is used so as to obtain rapid elution of the column. Mixtures of acids may be used for the elution. Thus one may use a mixture of formic acid with hydrochloric or sulphuric acids.

The following examples demonstrate the invention in greater detail. It is understood that these examples are given merely by way of illustration and not limitation.

*Example I*

A column was filled with an anion exchange resin of the quaternary amine type. In the top 25 cm. of the column the exchanger had been conditioned with formic acid to establish a pH of 2.8. In the bottom 22 cm. of the column, the exchanger had been conditioned with hydrochloric acid to establish a pH of 2.6.

A synthetic mixture of acids was prepared by dissolving the following quantities of acids in 200 ml. of water. The abbreviation "meq." means milliequivalents.

| | Milliequivalents |
|---|---|
| Lactic acid | 6.95 |
| Glycolic acid | 1.73 |
| Pyrrolidone carboxylic acid | 4.81 |
| Malic acid | 3.06 |
| Citric acid | 4.07 |

The solution of acids was poured on the column. The column was washed with water then eluted with an aqueous solution of formic and sulphuric acids—approximately 0.04 N in each acid. The rate of elution was 0.1 ml. per sq. cm. per min. The elution was conducted continuously and the eluate was collected in 10 ml. batches in separate test tubes. The material in each tube was subjected to analysis by the use of paper chromatograms to determine its content of the acids in question. Disregarding the forerunnings which did not contain any of the added acids, the first tube to contain one of the added acids was numbered as No. 1 and each following tube was numbered successively. The results obtained are set forth in the following table:

| Tube | Contents |
|---|---|
| 1 to 33 | Lactic acid. |
| 38 to 47 | Glycolic acid. |
| 50 to 109 | Pyrrolidone carboxylic acid. |
| 317 to 332 | Malic acid. |
| 329 to 341 | Citric acid. |

The tubes not included in the above table were found to be completely free from any of the acids initially present in the sample, that is, they contained only the eluting solvent. Tubes 329–332 contained only a small percentage of malic and citric acids.

*Example II*

Another run was carried out similar to that of Example I using the same anion exchanger and rate of elution as in Example I. In this case the exchange column contained a top layer of 10 cm. conditioned with acetic acid at pH 4.2; the next layer was 20 cm. conditioned with formic acid at pH 2.8; the next layer was 15 cm. conditioned with hydrochloric acid at pH 2.6; and the bottom layer was conditioned with hydrochloric acid at pH 2.4.

The mixture of acids applied to the column contained the following ingredients dissolved in 200 ml. of water:

| | Milliequivalents |
|---|---|
| Lactic acid | 7.00 |
| Glycolic acid | 2.00 |
| Pyrrolidone carboxylic acid | 5.05 |
| Malic acid | 3.07 |
| Citric acid | 4.27 |

The eluating solvent was an aqueous solution of formic, hydrochloric, and sulphuric acids, 0.4 N with respect to each.

The following results were obtained:

| Tube | Content | Recovery of acid, percent |
|---|---|---|
| 87-114 | Lactic acid | 99 |
| 114-130 | Glycolic acid | 100 |
| 143-180 | Pyrrolidone carboxylic acid | 99 |
| 266-282 | Malic acid | 100 |
| 282-291 | Citric acid | 99 |

As in Example I, the tubes not listed in the table contained none of the acids initially present in the sample.

*Example III*

Another run was carried out using the same technique of Example I and the same anion exchanger and rate of elution.

The exchanger column contained a top layer of 30 cm. conditioned with formic acid at pH 2.6; the next layer was 15 cm. conditioned with hydrochloric acid at pH 2.5; the bottom layer was 10 cm. conditioned with hydrochloric acid at pH 2.3.

In this case the liquid used to load the column was 400 ml. of decationized sugar beet diffusion liquor containing about 20 meq. of various organic acids.

The eluting solvent was the same as in Example II.

The following results were obtained:

| Tube | Content |
|---|---|
| 45 to 58 | Lactic acid. |
| 70 to 75 | Glycolic acid. |
| 90 to 100 | Succinic acid. |
| 106 to 120 | Pyrrolidone carboxylic acid. |
| 197 to 203 | Malic acid. |
| 203 to 209 | Citric acid. |
| 203 | Unknown acid. |
| 210 to 212 | Citric and oxalic acid. |

Having thus described our invention, we claim:

1. A process for separating an acid of the group consisting of acetic acid, lactic acid, glycolic acid, succinic acid, pyrrolidone carboxylic acid, malic acid, citric acid, and oxalic acid from its mixture with at least one other acid of said group which comprises adsorbing such a mixture of acids on an anion exchange bed which has been conditioned with an acid which is stronger than the acids to be separated the pH of the conditioned exchanger being about 1 to 1.5 pH units less than the pK of the weakest acid contained in said mixture, then eluting the exchanger with a solution of a strong mineral acid.

2. A process for separating lactic acid from a mixture containing the same and other acids which comprises adsorbing the mixture on an anion exchange bed which has been conditioned with formic acid, the pH of the conditioned exchanger being about 2.4 to 2.9, then eluting the exchanger with a solution of a mineral acid stronger than lactic acid.

3. A process for separating lactic acid from a sugar beet liquor which comprises applying a decationized sugar beet liquor to an anion exchange bed which has been conditioned with formic acid, the pH of the conditioned exchanger being about 2.8, whereby the organic acids in the liquor are adsorbed on the anion exchange bed, then eluting the exchanger with a solution of a mineral acid stronger than lactic acid and recovering the portion of the eluate which is rich in lactic acid.

4. A process for separating organic acids from a mixture thereof, said mixture containing a plurality of groups of acids the acids in each group having related dissociation values, which comprises adsorbing the mixture on an anion exchange bed divided into a plurality of zones each zone serving to separate the acids in one of said groups, the exchanger in each zone having been conditioned with an acid stronger than the acids to be separated in said zone, the pH of the conditioned exchanger being about 1 to about 1.5 pH units less than the pK of the weakest acid in this group, then eluting the exchange bed with a solution of a strong mineral acid.

5. A process for separating organic acids from a sugar beet liquor which comprises applying said liquor to an anion exchange bed divided into a plurality of zones, the exchanger in one zone having been conditioned with formic acid to a pH of about 2.6 to 3.0, the exchanger in another zone having been conditioned with hydrochloric acid to a pH of about 1.9 to 2.4, whereby the organic acids in the liquor are adsorbed on the anion exchange bed, then eluting the exchange bed with a solution of a strong mineral acid.

6. A process for separating organic acids from a sugar beet liquor which comprises applying a decationized sugar beet liquor to an anion exchange bed divided into a plurality of zones, the exchanger in one zone having been conditioned with formic acid at about pH 2.6, the exchanger in a second zone having been conditioned with hydrochloric acid at about pH 2.5, the exchanger in the third zone having been conditioned with hydrochloric acid at about pH 2.3, whereby the organic acids in the liquor are adsorbed on the anion exchange bed, then eluting the exchange bed with a solution of a strong mineral acid and separately collecting the effluent fractions rich in lactic, glycolic, succinic, pyrrolidone carboxylic, malic, citric, and oxalic acids.

HARRY S. OWENS.
JOHN B. STARK.
ALAN E. GOODBAN.

References Cited in the file of this patent

UNITED STATES PATENTS

| Number | Name | Date |
|---|---|---|
| 2,341,907 | Cheetham et al. | Feb. 15, 1944 |
| 2,549,378 | Kunin | Apr. 17, 1951 |
| 2,640,849 | Liggett et al. | June 2, 1953 |
| 2,640,850 | Liggett et al. | June 2, 1953 |

FOREIGN PATENTS

| Number | Country | Date |
|---|---|---|
| 941,968 | France | Jan. 26, 1949 |

OTHER REFERENCES

Kunin et al., "Ion Exchange Resins" (Wiley) p. 66 (1950).

Kunin et al., J. Am. Chem. Soc., vol. 69, pp. 2874-8 (1947).

Nachod, "Ion Exchange" (Academic Press) p. 26 (1949).